Patented June 16, 1936

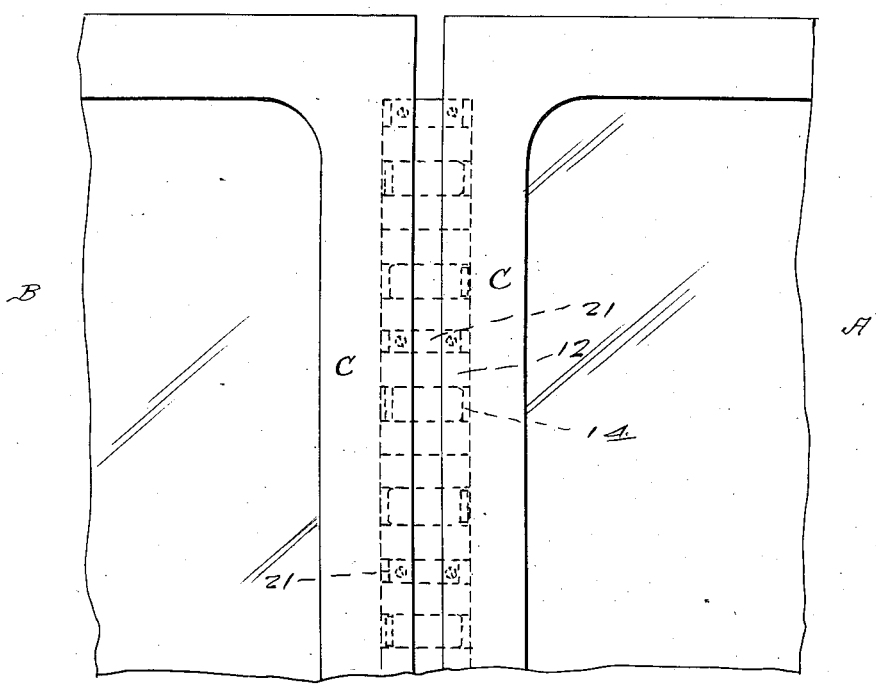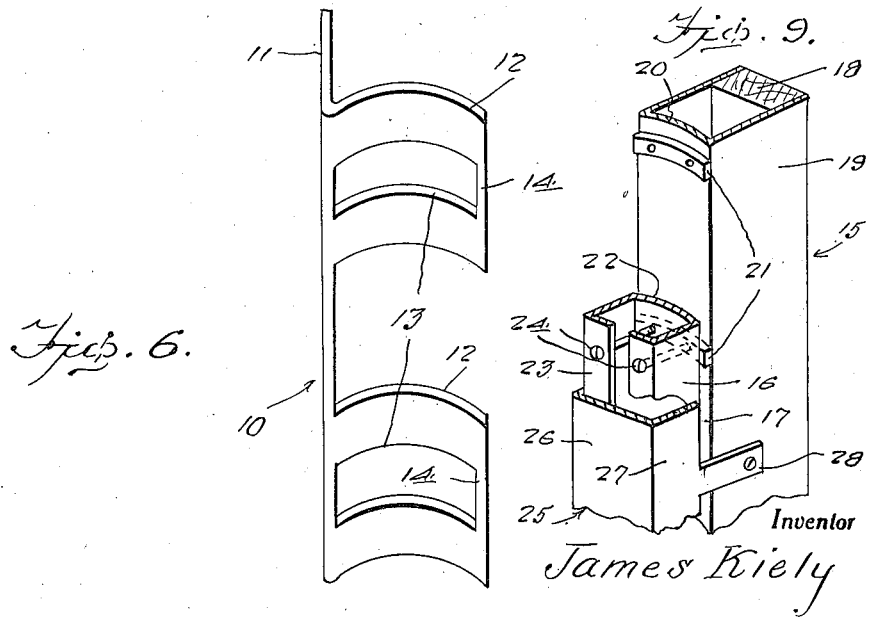

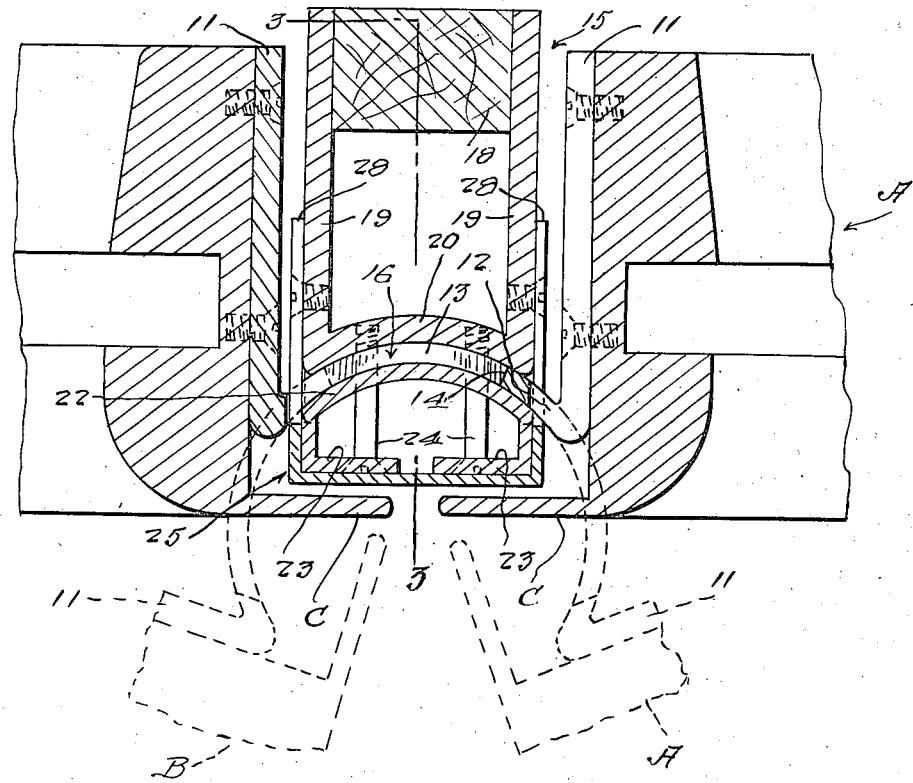
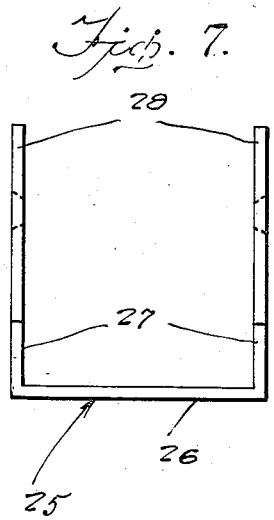
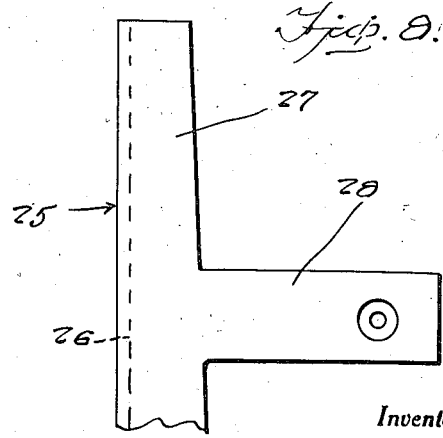

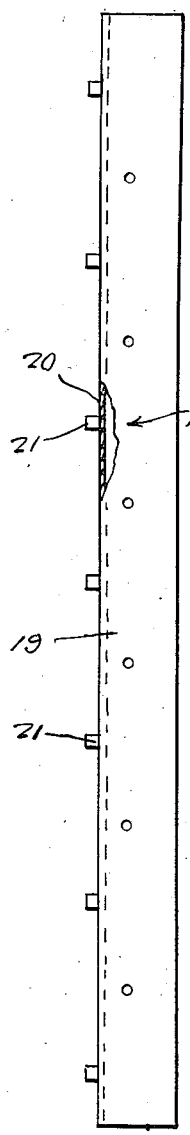
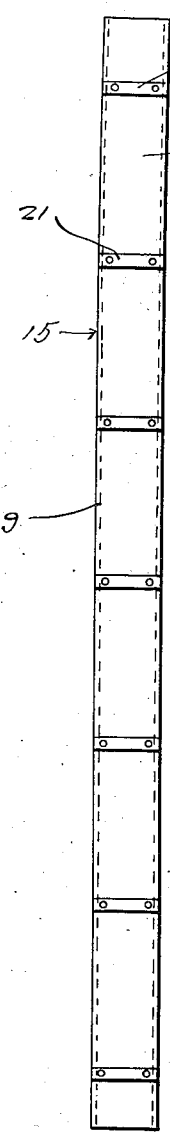
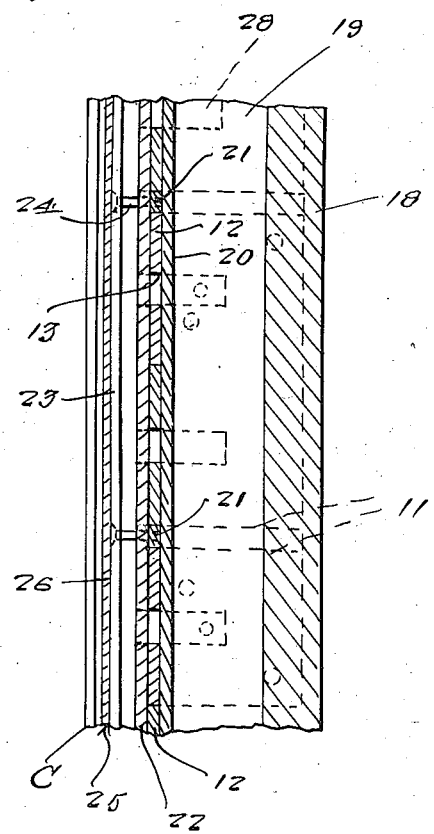

2,044,533

UNITED STATES PATENT OFFICE 2,044,533

VEHICLE DOOR HINGE AND MOUNTING THEREFOR

James Kiely, Amesbury, Mass.

Application June 10, 1935, Serial No. 25,917

6 Claims. (Cl. 296—44)

This invention relates to an improved automobile door hinge construction and has reference to the concealed type of hinge susceptible of efficient and adequate installation on a body either of the all-steel or composite construction, the hinge means being of either a single or duplex form. Briefly, the preferred adaptation of the invention has to do with a double-acting or duplex hinge arrangement wherein adjacent hinged ends of the door are disposed in close proximity to and on opposite sides of the body pillar, the pillar being of a special type and the hinges including assemblies wherein the companion or complemental sections are formulated to provide attaching flanges secured to the door frames, said attaching flanges being provided with arcuate or segmental supporting and guiding leaves, the relatively slidable edges of the leaves of respective parts being disposed in superposed sliding contact and otherwise coordinated to cooperate satisfactorily with the special accommodating pillar or post construction.

In reducing the inventive idea to actual practice, I have evolved and produced a strong, durable and economical construction especially designed to give a maximum of clearance between the door panel flanges and the body pillar, a feature so much sought after when the doors on the same side of the car are separately or collectively opened.

Furthermore, I have designed what I believe to be a feasible and practicable construction which is more aptly fitted to fulfill the requirements of a structure of this type, one which is capable of withstanding rough usage to which automobile doors are subjected, a particular embodiment wherein the hinge means is commensurate with the vertical dimensions of the pillars or posts so as to provide a more substantial arrangement on those types of doors where the windows slide back into the hinge pillar for ventilation purposes.

The foregoing will serve by way of brief introduction to give an insight into the character of the invention adapted to fulfill my purposes, but other features and advantages will become apparent from the following detailed description as well as the accompanying illustrative drawings.

In the drawings, wherein like numerals are employed to designate corresponding details or parts throughout the views:

Figure 1 is a fragmentary elevational view showing a pair of hingedly mounted doors supported in accordance with the principles and ideas of the present invention, the essential features of the invention being hidden but portions being disclosed in dotted lines.

Figure 2 is a fragmentary horizontal sectional view with portions in elevation disclosing the special configuration, adaptation and mechanical coordination of the complete pillar construction and hinge assembly.

Figure 3 is a fragmentary vertical sectional view taken approximately on the plane of the line 3—3 of Figure 2.

Figure 4 is an edge view, on a reduced scale, showing the general configuration and idea of the channel shaped part of the hinge post or pillar.

Figure 5 is a face view of the part shown in Figure 4.

Figure 6 is a perspective illustration of one of the hinge members attachable to one of the doors.

Figure 7 is a top view of a shield or cover plate forming a part of the post assembly.

Figure 8 is a side view of the upper portion of said cap-like cover plate.

Figure 9 is a fragmentary perspective illustration of the essential parts of the post construction or assembly.

Since the general assembly and matched correlation of parts is disclosed in Figure 2, attention is first invited to this figure wherein it will be observed that one door is denoted by the letter A and the complemental door by the letter B. These doors are provided with the customary guard flanges C. The adjacent hinge attached edge portions of the frames of the doors are designed to carry special hinge brackets and a series of brackets are provided for the respective doors and these are disposed in alternating or staggered relation so as to provide the requisite interfitting or alternate coaction. Each bracket or fixture is distinguished by the numeral 10 and comprises a sheet metal stamping which includes an attaching flange of appropriate length 11 screwed or otherwise fastened to the frame of the door, said flange being provided with a pair of outstanding arcuate or segmental wing portions 12 which may be conveniently designated as the hinge elements or segments. In general outline each segment is of approximate rectangular form and provided with a central guide slot 13, the outer portion of which is differentiated by the numeral 14 in that it serves as a stop or limiting feature to be hereinafter described. Assuming when considering Figure 6 that the bracket 10 is attachable to the door B it is obvious that the corresponding or companion bracket on the door A is attached in a staggered position so that its segments 12 correspond to those shown in Figure 6 and so that they are brought together in interfitting or interlocked relation in which position the superposed edge portions ride upon one another in slidable contact.

The composite pillar or post construction, which is a part of the body (not shown) may be of wood with appropriate metallic parts or it may be of a combination of wood and metal.

Broadly the post embodies the relatively fixed pillar 15 and the complemental adapter clamps 16, the opposed faces of these being spaced apart to accommodate the hinge segments 12 and being of concavo-convex cross sectional configuration. That is to say, these curved portions or faces of the parts 15 and 16 are spaced apart to define a vertically elongated guideway 17 in which the segments 12 of the respective hinge brackets are worked.

Explicitly, the part 15 comprises a wooden stile 18 to which the side flanges 19 of the channel shaped runner attach. The transversely curved web 20 is spaced from the stile 18. Moreover at vertically spaced points it has fastened thereto either by riveting or welding correspondingly curved transversely arranged cleats 21. The cleats are spaced apart so as to provide a space between themselves sufficient to accommodate one complemental pair or set of the hinge brackets 10. These cleats function as stabilizing members as well as guides.

The complemental clamp or adapter 16 is constructed of sheet metal and is of hollow form being somewhat of tubular cross sectional configuration. For sake of convenience, the effective clamping web 22 thereof may be distinguished as of convex form so as to match and correspond to the concave web 20. The side flanges are provided with inturned lateral flanges 23 which carry the bolts 24 which serve to secure the parts together in spaced parallelism. Obviously, the threaded ends of the bolts are tapped into screw threaded holes formed in the concave web 20. It is thus seen that the hinge segments 12 work in and out in the space 17 defined by these parts 15 and 16.

As a further feature, I utilize a supplementary part which may be denoted as a cap 25. This is also of channel shaped cross sectional form and it is fitted over the flange portion of the adapter clamp 16. Its web or plate portion 26 serves as a protector shield and closure for the open outer side of the adapter clamp 16. Then too, its laterally bent side flanges 27 are provided at predetermined points with extensions 28 which are in effect guide arms, the free ends of these being bolted or otherwise fastened to the side flanges of the shell-like runner 15. In fact, these guide arms extend through the slots 13 and cooperate with the complemental stops 14 to limit the outward swinging of the doors as indicated in dotted lines in Figure 2.

By way of summation then, it will be seen that the composite hinge post is characterized by the vertically elongated concave web 20, the complemental spaced parallel convex web 22 on the part 16, and the confining and shielding cap 25. Located between the parts 15 and 16 and confined in the space 17 are the guide and reinforcing cleats 21. Positioned in proper relationship to extend through the slots in the superposed hinge segments 12 are the stop arms 28, these bridging the open edge portions of the vertical guideway 17. It follows therefore, that when the parts are assembled as disclosed in Figure 2 we have a pair of doors A and B hingedly attached to the special hinge posts in such a way as to naturally guide the movement of the doors from closed to open positions and vice versa.

Structurally stated, I am especially interested in the vertical unit 16 and the complemental unit 17 having the spaced apart plate or web portions defining an arcuate guideway of a vertically elongated type to accommodate the segmental slotted hinge elements 12, with or without the other features. More specifically however, I am disposed to emphasize the incorporation in this arrangement of the shield or cap 25 having the integral arms 28 serving in conjunction with the slotted elements 12 to limit the outward swinging movements. All of these parts have been carefully selected and joined together to provide a smooth and dependable door hinge construction. It is evident, of course, that the arrangement is especially adapted to a double or duplex door construction. At the same time, it is likewise evident that the same type of a post may well be employed for a single door and associated hinge structure. I do not wish to be limited, however, to an all-metal structure since the same principle is susceptible of being utilized in an arrangement incorporating a post wherein the parts 15 and 16 are of wood.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details coming within the field of invention claimed may be resorted to in actual practice if desired.

Having thus described the invention, what is claimed as new is:

1. In a door and hinge construction of the class described, a vertically disposed hinge post including a relatively stationary unit having a concaved portion, a separable clamping unit cooperable therewith and including a convex portion disposed in spaced parallelism to said concave portion to define a guideway of transversely curved form, a pair of companion hinge brackets, said brackets having hinge elements shaped for workable operation in said guideway, said hinge elements being disposed in superposed edge to edge relationship, and transverse curved cleats mounted in the guideway for cooperation with the hinge elements.

2. In a structure of the class described, a hinge post including a channel shaped unit having a longitudinally elongated transversely curved concave web, an adapter clamping unit of a length commenurate with said first named unit, said clamping unit being in the form of a hollow casting and having a convex web opposed to and spaced in parallelism with said concave web, together with a finishing cap and shield unit fitted telescopically over said clamping unit and including arm extensions bridging the longitudinal edge portions of the existing space between said concave web and convex portion.

3. In a structure of the class described, a hinge post including a channel-shaped member having a longitudinally elongated transversely curved concave web portion, an adapter and clamping unit of a length commensurate with said web and including a convex web portion opposed to and disposed in spaced parallelism with said concave web portion, a finishing cap and shield unit fitted telescopically over said clamping unit and including arm extensions bridging the longitudinal open edge portion of the space existing between said web portions, a plurality of vertically spaced transversely arranged and curved cleats fixedly attached to said concave web portion and located in the aforesaid space, and a pair of complemental door hinges having interlocking arcuate wing members operating in said space, said wing members being slotted to accommodate said cleats as well as the arm extensions on said shield unit.

4. In a structure of the class described, in combination, a relatively stationary hinge post having a channel-shaped unit fastened thereto, the web portion of said unit being transversely bowed to provide a concave guide track, a clamping unit of a length commensurate with said channel-shaped unit, having a convex surface opposed in spaced parallelism to said concave guide track, transversely curved vertically spaced cleats interposed between said track and convex surface, fastenings simultaneously securing said clamping unit and cleats to said channel-shaped unit, and doors having transversely curved slotted wing portions operable in the space between said concave track and convex portions of the clamping unit, said cleats being cooperable with the slots in said wing portions.

5. In a vehicle door hinge and mounting therefor, a vertically elongated relatively stationary supporting post unit including a vertically elongated and disposed member having a concaved portion, vertically spaced transversely disposed cleats attached to said concaved portion, a hinge fixture including a curved wing portion whose curvature corresponds to that of the concaved web portion, said wing portion having a horizontally disposed slot of a length greater than the cleat allowing the wing portion to accommodate the cleat for requisite, maintenance and stop action, and a complemental vertically elongated clamping unit aligned with the post unit and having a convex portion disposed in spaced parallelism to said concaved portion and fastened to said cleat.

6. A sectional pillar of the type described comprising a relatively fixed post embodying a stile, a channel-shaped member having its side walls attached to and enclosing the stile, the web portion thereof being of transversely curved concave formation, an adapter clamping unit of a length commensurate with the post, said clamping unit being of hollow construction and having a convex web opposed to and located in parallelism with said concave web, and connecting and spacing means separately joining the adapter clamping unit to said post.

JAMES KIELY.